(12) United States Patent
Matysek

(10) Patent No.: US 6,203,310 B1
(45) Date of Patent: Mar. 20, 2001

(54) INJECTION MOLDING APPARATUS HAVING MOLD CORES WITH REVERSE TAPER

(75) Inventor: Paul Richard Matysek, Toronto (CA)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 09/221,767

(22) Filed: Dec. 28, 1998

(30) Foreign Application Priority Data

Dec. 14, 1998 (CA) .................................................. 2256090

(51) Int. Cl.[7] .................................................. B29C 41/46
(52) U.S. Cl. ............................................. 425/547; 425/552
(58) Field of Search ................................... 425/526, 547, 425/548, 552

(56) References Cited

U.S. PATENT DOCUMENTS

| 2,434,594 | 1/1948 | Schultz | 18/42 |
|---|---|---|---|
| 4,054,630 | * 10/1977 | Wang | 425/526 |
| 4,151,247 | 4/1979 | Hafele | 264/328 |
| 4,289,817 | 9/1981 | Valyi | 428/35 |
| 4,332,545 | 6/1982 | Cargile | 425/577 |
| 4,571,171 | 2/1986 | Blank et al. | 425/533 |
| 5,061,174 | 10/1991 | Gellert . | |
| 5,232,718 | 8/1993 | Miyazawa et al. | 425/577 |
| 5,582,851 | 12/1996 | Hofstetter et al. | 425/562 |
| 5,688,570 | 11/1997 | Ruttinger, Sr. | 428/35.7 |
| 5,736,173 | 4/1998 | Wright et al. | 425/577 |

* cited by examiner

Primary Examiner—Tim Heitbrink
(74) Attorney, Agent, or Firm—Foley & Lardner

(57) ABSTRACT

Injection molding apparatus having an elongated cooled mold core (10) which forms an inner side (90) of the cavity (66). The elongated mold core (10) extends through an opening (92) through a core lock member (94). The outer surface (80) of the mold core (10) and the inner surface (120) of the opening (92) through the core lock member (94) have matching parts (118, 122) which taper inwardly towards the rear core (84) of the mold core (10). A nut (126) secures the mold core (10) to the core lock member (94) with the tapered parts (118, 122) abutting against each other. The reverse taper of these parts (118, 122) prevents injection pressure impact opening any space between them and thus prevents lateral core shift.

12 Claims, 2 Drawing Sheets

INJECTION MOLDING APPARATUS HAVING MOLD CORES WITH REVERSE TAPER

BACKGROUND OF THE INVENTION

This invention relates to hot runner injection molding and more particularly to such apparatus having an elongated cooled mold core and core lock member with matching abutting parts of their surfaces having a reverse taper.

Circulating cooling fluid through elongated mold cores to reduce cycle time is well known. Molds with long mold cores for making products such as pill vials, cosmetic containers, medical beakers and beverage bottle preforms have a problem known as core shift. As seen in U.S. Pat. No. 5,061,174 to Gellert which issued Oct. 29, 1991, the rear part of the outer surface of the mold core and the abutting surface of the surrounding stripper ring are usually slightly tapered outwardly towards the rear end to facilitate assembly. When the high injection pressure impacts against a number of mold cores in a large mold, it can force the mold cores slightly rearwardly which loosens their tapered seats in the stripper rings and creates space for the mold cores to shift slightly to one side or the other. This lateral shifting of the mold cores results in uneven filling of the cavities and forms a non-concentric product which is unacceptable. This is particularly a problem for bottle preforms, as the blown bottle may sit crookedly or bulge out on one side.

Another problem with elongated cooled mold cores is that the high injection pressure can cause them to flex slightly. Thus, both the core shift and flexing problems limit injection pressure and prevent faster filling and shorter cycle times.

SUMMARY OF THE INVENTION

Accordingly, it is an objection of the present invention to at least partially overcome the disadvantages of the prior art by providing a part of the rear portion of an elongated mold core and the abutting surface of the core lock member with matching reverse tapers.

To this end, in one of its aspects, the invention provides injection molding apparatus having an elongated cavity in a mold and an elongated cooled mold core fitting through an opening having an inner surface in a core lock member attached to a core backing plate. The mold core has a front end, a rear end, an outer surface, a central cooling fluid duct and one or more outer cooling fluid conduit extending longitudinally around the central cooling fluid duct. The outer surface of the mold core has a front portion and a rear portion. The front portion of the outer surface of the mold core forms an inner side of the cavity. A part of the rear portion of the outer surface of the mold core is tapered inwardly towards the rear end of the mold core. The tapered part of the rear portion of the outer surface of the mold core abuts against a matching part of the inner surface of the opening in the core lock member which is also tapered inwardly towards the rear end of the mold core.

Further objects and advantages of the invention will appear from the following description taken together with the accompanying drawings.

DETAILED DESCRIPTION OF THE INVENTION

Figure 1:
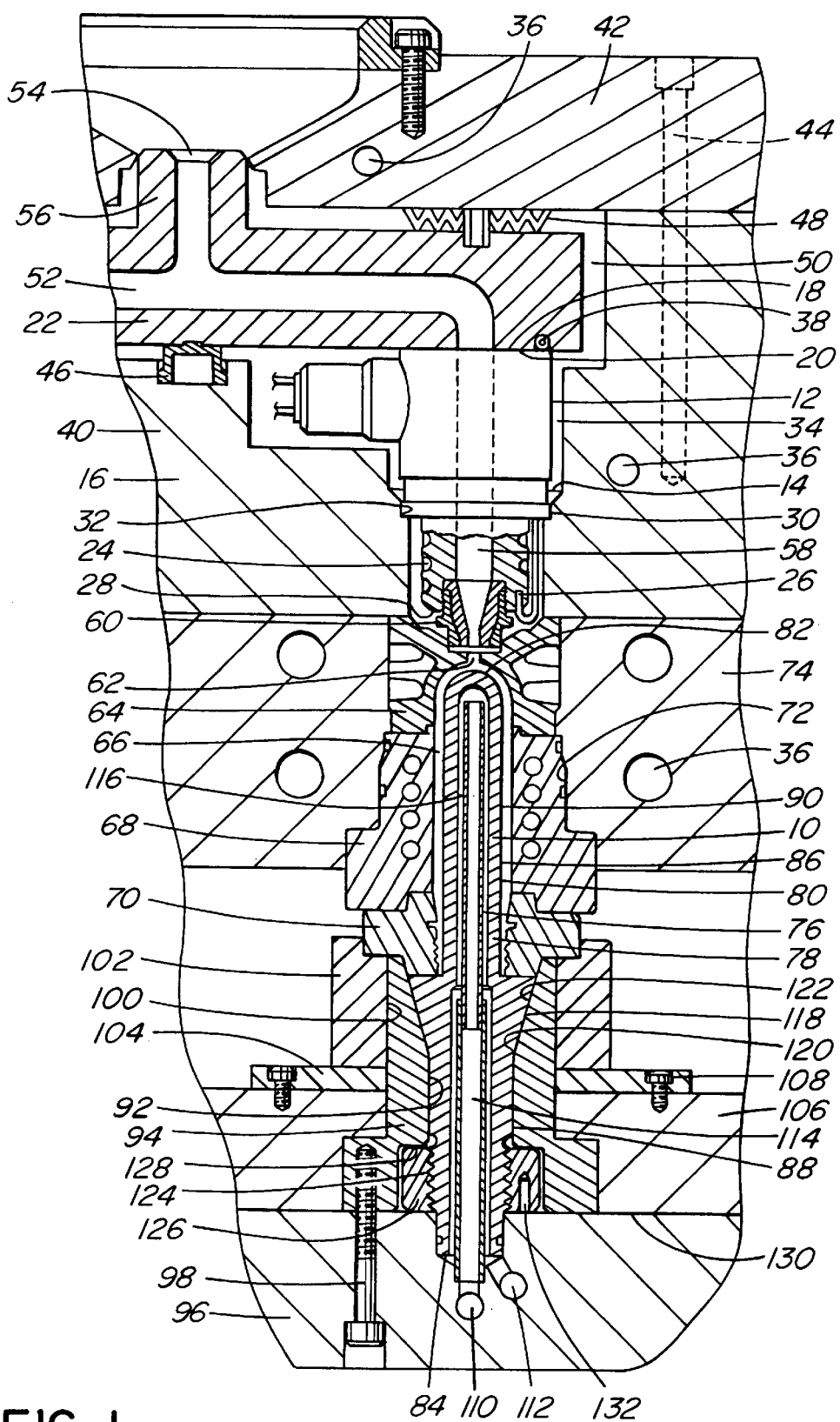
FIG. 1 is a sectional view showing a portion of a multi-cavity injection molding system having an elongated cooled mold core and core lock member according to a preferred embodiment of the invention.
Figure 2:
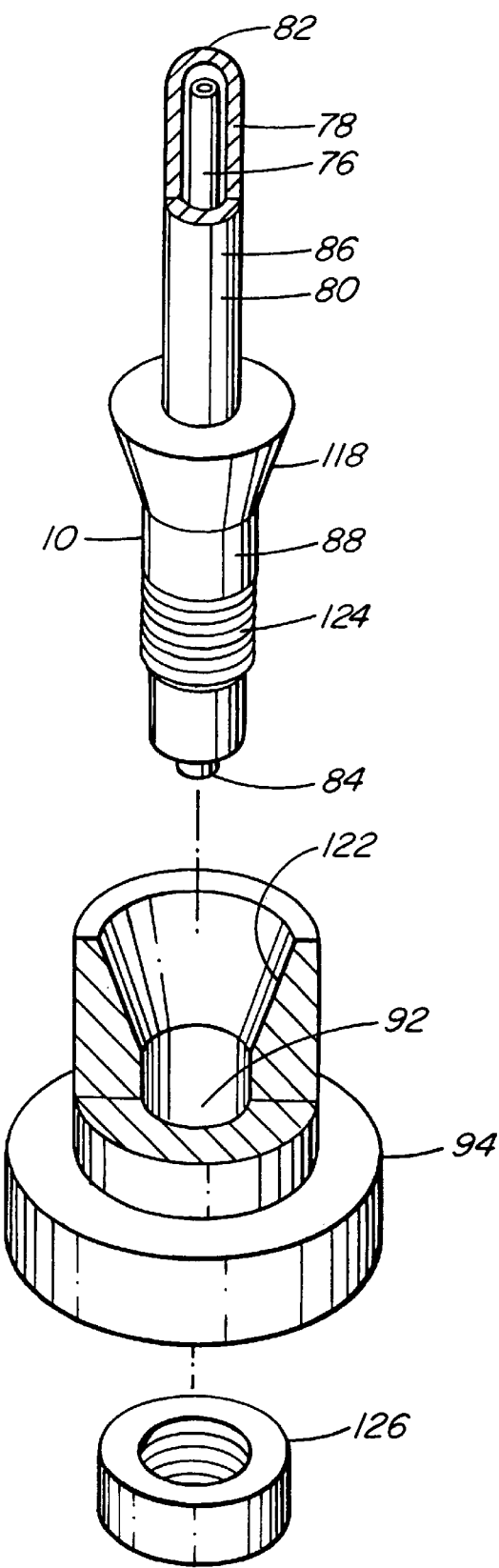
FIG. 2 is an exploded isometric view showing how the mold core is received in the core lock member with their reverse tapered surfaces abutting.

Reference is first made to FIGS. 1 and 2 which show a portion of a multi-cavity injection molding system or apparatus used for molding beverage bottle preforms having an elongated cooled mold core 10 according to a preferred embodiment of the invention. In this configuration, a number of heated nozzles 12 are mounted in openings 14 in a mold 16 with the rear end 18 of each heated nozzle 12 abutting against the front face 20 of a steel melt distribution manifold 22. Each nozzle 12 is heated by an integral electrical heating element 24 and has a thermocouple element 26 extending into its front end 28 to monitor and control the operating temperature. Each heated nozzle 12 has a cylindrical locating flange 30 seated in a circular locating seat 32 in the opening 14. This provides an insulative air space 34 between the heated nozzle 12 and the surrounding mold 16, which is cooled by pumping cooling water through cooling conduits 36.

The melt distribution manifold 22 is also heated by an integral electrical heating element 38. The melt distribution manifold 22 is mounted between a manifold plate 40 and a clamp plate 42 which are secured together by bolts 44. The melt distribution manifold 22 is located by a central locating ring 46 and a number of resilient spacers 48 which provide an insulative air space 50 between it and the surrounding cooled mold 16.

A melt passage 52 extends from a central inlet 54 in an inlet portion 56 of the melt distribution manifold 22 and branches in the melt distribution manifold 22 to extend through a central melt bore 58 in each of the heated nozzles 12. The melt passage 52 extends through a two-piece nozzle seal 60 aligned with a gate 62 extending through a cooled gate insert 64 to an elongated cavity 66. This cavity 66 for making beverage bottle preforms extends between a cavity insert 68 and thread split inserts 70 on the outside and the cooled mold core 10 on the inside. The gate insert 64 and the cavity insert 68 are seated in an opening 72 in a cavity plate 74 through which cooling water lines (not shown) extend to the cooled gate insert 64.

In the configuration shown, the cooled mold core 10 is made of an elongated hollow inner part 76 extending inside an elongated hollow outer part 78. The mold core 10 has an outer surface 80 extending from a dome shaped front end 82 to a rear end 84. The outer surface 80 of the elongated mold core 10 has a front portion 86 and a rear portion 88 according to the invention. The front portion 86 forms the inner side 90 of the cavity 66, and the rear portion 88 extends rearwardly from the cavity 66 through an opening 92 through a core lock member 94 which is secured to a core backing plate 96 by bolts 98. The core lock member 94 in turn extends through an opening 100 through a slide member 102 and a wear plate 104 which is secured to a stripper plate 106 by screws 108. Cooling fluid supply and return lines 110, 112 extend in the core backing plate 96 and are connected respectively to a central cooling fluid duct 114 extending longitudinally through the inner part 76 and an outer cooling fluid duct 116 extending between the inner part 76 and the outer part 78. While in this case the outer cooling fluid duct 116 is cylindrical, in other configurations it can consist of a number of bores or straight or spiral grooves extending through the mold core 10 around the central cooling fluid duct 114. Of course, in other applications, the mold 16 can have different numbers and shapes of parts and plates depending upon the configuration required.

The rear portion 88 of the outer surface 80 of the mold core 10 has a tapered part 118 which tapers inwardly towards the rear end 84 of the mold core 10. As can be seen, the opening 92 through the core lock member 94 has an inner surface 120 with a tapered part 122 which also tapers inwardly towards the rear end 84 of the mold core 10 and matches the tapered part 118 of the rear portion 88 of the outer surface 80 of the mold core 10. The rear portion 88 of the outer surface 80 of the mold core 10 also has a threaded part 124 onto which a cylindrical nut 126 is screwed. The nut 126 is seated in a seat 128 in the rear face 130 of the core lock member 94 and is tightened by a spanner wrench which fits in holes 132 to secure the mold core 10 to the core lock member 94 with the tapered part 118 of the outer surface 80 of the mold core 10 abutting against the matching tapered part 122 of the inner surface 120 of the opening 92 through the core lock member 94. Thus, with these reverse tapered parts 118, 122, if the impact of the high injection pressure impacting against the mold core 10 drives it slightly rearwardly in the mold 16, no space can be opened between the tapered part 118 of the outer surface 80 of the mold core 10 and the surrounding matching tapered part 122 of the inner surface 120 of the core lock member 94 to allow lateral core shift. In other words, the injection pressure is converted to taper locking pressure.

In use, after the system has been assembled as shown in FIG. 1, electrical power is applied to the heating elements 24, 38 to heat the nozzles 12 and the melt distribution manifold 22 to a predetermined operating temperature. A suitable cooling fluid such as water is also circulated by pumps (not shown) through the cooling conduits 36 in the mold 16 and the lines leading to the cavity inserts 68. Usually a cleaner cooling fluid such as glycol is pumped in a closed loop cooling system through the supply and return lines 110, 112 to circulate through the mold cores 10. Pressurized melt from a molding machine (not shown) is then introduced according to a predetermined injection cycle into the central inlet 54 of the melt passage 52 of the melt distribution manifold 22, from where it flows through the central melt bore 58 in each of the heated nozzles 12 and the two-piece nozzle seals 60 and through the gates 62 to fill the cavities 66. After the cavities 66 are full, injection pressure is held momentarily to pack and then released. After a short cooling period, the mold 16 is opened to eject the product. After ejection, the mold 16 is closed and the injection pressure is reapplied to refill the cavity 66. This cycle is repeated continuously with a cycle time that has been reduced as a result of improved cooling from the mold core 10.

While the description of the cooled mold core 10 and core lock member 94 having matching tapered surfaces 118, 122 has been given with respect to a preferred embodiment, it will be evident that various other modifications are possible without departing from the scope of the invention as understood by those skilled in the art and as provided in the following claims.

The embodiments of the invention in which an exclusive property or privilege is claimed is defined as follows:

1. In an injection molding apparatus having a cavity (66) in a mold (16), the cavity (66) extending rearwardly from a gate (62) and formed in part by an outer mold insert (70) forming at least a portion of the outer side of the cavity (66), and by a mold core (10), the core (10) having a front end (82) disposed near the gate (62), a rear end (84), and an outer surface (80) with a front portion (86) thereof forming the inner side (90) of the cavity (66) and a rear portion (88) thereof adapted for fixedly supporting the core (10) relative to a core supporting member (96), the improvement comprising:

a core lock member (94) supported by the core supporting member (96), the core lock member (94) having an opening (92) with an inner surface (122) surrounding and engaging the rear portion (88) of the core outer surface (80) and an engaged portion of the outer mold insert (70), wherein the inner surface (120) of the core lock member (94) and the rear portion (88) of the core outer surface (80) comprise mating surfaces (122, 118) which are tapered inwardly toward the rear end (84) of the core (10) to centrally align the core (10) and the core lock member (94), wherein the inner surface (122) of the core lock member (94) and the engaged portion of the outer mold insert (70) comprise mating surfaces which are tapered inwardly toward the rear end (84) of the core (10) to centrally align the outer mold insert (70) and the core lock member (94), and wherein the tapered mating surface (118) of the rear portion (88) of the core outer surface (80) has the same taper as the tapered mating surface of the outer mold insert (70) and forms a rearward extension thereof, and the tapered mating surface (122) of the core lock member (94) is uninterrupted and commonly engages the tapered mating surfaces of the rear portion (88) of the core outer surface (80) and the tapered mating surface of the outer mold insert (70), whereby any rearward motion of the core (10) due to pressurized melt in the cavity (66) more tightly wedges the core (10) in the core lock member (94) to keep the core (10) from shifting laterally in the cavity (66).

2. Injection molding apparatus as claimed in claim 1 wherein the rear portion (88) of the outer surface (80) of the mold core (10) has a threaded part (124) engaged by a threaded nut (126) to secure the mold core (10) to the core lock member (94).

3. Injection molding apparatus as claimed in claim 2 wherein the threaded nut (126) is secured in a seat (128) in the rear face (130) of the core lock member (94) extending around the opening (92) through the core lock member (94).

4. Injection molding apparatus as claimed in claim 3 wherein the mold core (10) has a dome shaped front end (82).

5. Injection molding apparatus as claimed in claim 1 wherein all of said tapered mating surfaces are substantially conical.

6. Injection molding apparatus as claimed in claim 5 wherein the rear portion (88) of the core outer surface (80) has a threaded part (124) engaged by a threaded nut (126) to secure the mold core (10) to the core lock member (94).

7. Injection molding apparatus as claimed in claim 6 wherein the threaded nut (126) is secured in a seat (128) in the rear face (130) of the core lock member (94) extending around the opening (92) through the core lock member (94).

8. Injection molding apparatus as claimed in claim 1 wherein the outer mold insert (70) is shaped internally to form the threaded neck of a bottle preform.

9. Injection molding apparatus as claimed in claim 1 wherein the cavity (66) and the core (10) are elongated.

10. Injection molding apparatus as claimed in claim 1 wherein the cavity (66) and the core (10) are elongated.

11. In an injection molding apparatus having a cavity (66) in a mold (16), the cavity (66) extending rearwardly from a gate (62) and formed in part by an outer mold insert (70) forming at least a portion of the outer side of the cavity (66), and by a cooled mold core (10), the core (10) having a closed front end (82) disposed near the gate (62), a rear end (84), at least one internal cooling fluid duct (114, 116) communicating with an external cooling fluid source through the rear end (84), and an outer surface (80) with a front portion (86) thereof forming the inner side (90) of the cavity (66) and a rear portion (88) thereof adapted for fixedly supporting the core (10) relative to a core supporting member (96), the improvement comprising:

a core lock member (94) supported by the core supporting member (96), the core lock member (94) having an opening (92) with an inner surface (120) surrounding and engaging the rear portion (88) of the core outer surface (80), wherein the inner surface (120) of the core lock member (94) and the rear portion (88) of the core outer surface (80) comprise mating surfaces (122, 118) which are tapered inwardly toward the rear end (84) of the core (10) to centrally align the core (10) and the core lock member (94), and wherein the rear portion (88) of the core outer surface (80) has a threaded part (124) engaged by a threaded member (126) which secures the mold core (10) to the core lock member (94), whereby tightening of the threaded member (126) centrally wedges the core (10) in the opening (92) in the core lock member (94), and any rearward motion of the core (10) due to pressurized melt in the cavity (66) more tightly wedges the core (10) in the core lock member (94) to keep the core (10) from shifting laterally in the cavity (66).

12. Injection molding apparatus as claimed in claim 11 wherein the threaded member is a nut (126) secured in a seat (128) in the rear face (130) of the core lock member (94) extending around the opening (92) through the core lock member (94).

* * * * *